Dec. 3, 1957 J. R. WOOD 2,815,208
SHEET CONVEYOR MECHANISM
Filed Aug. 17, 1953 5 Sheets-Sheet 1
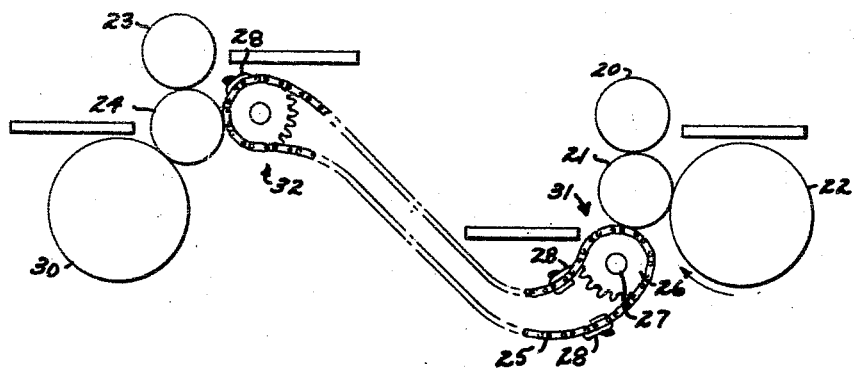
Fig. I
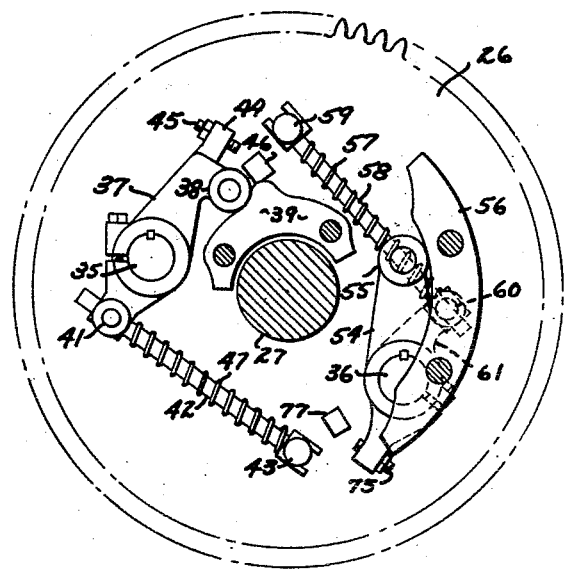
Fig. IV
Inventor
JAMES R. WOOD
By Hudson, Boughton,
Williams, David & Hoffmann
Attorneys

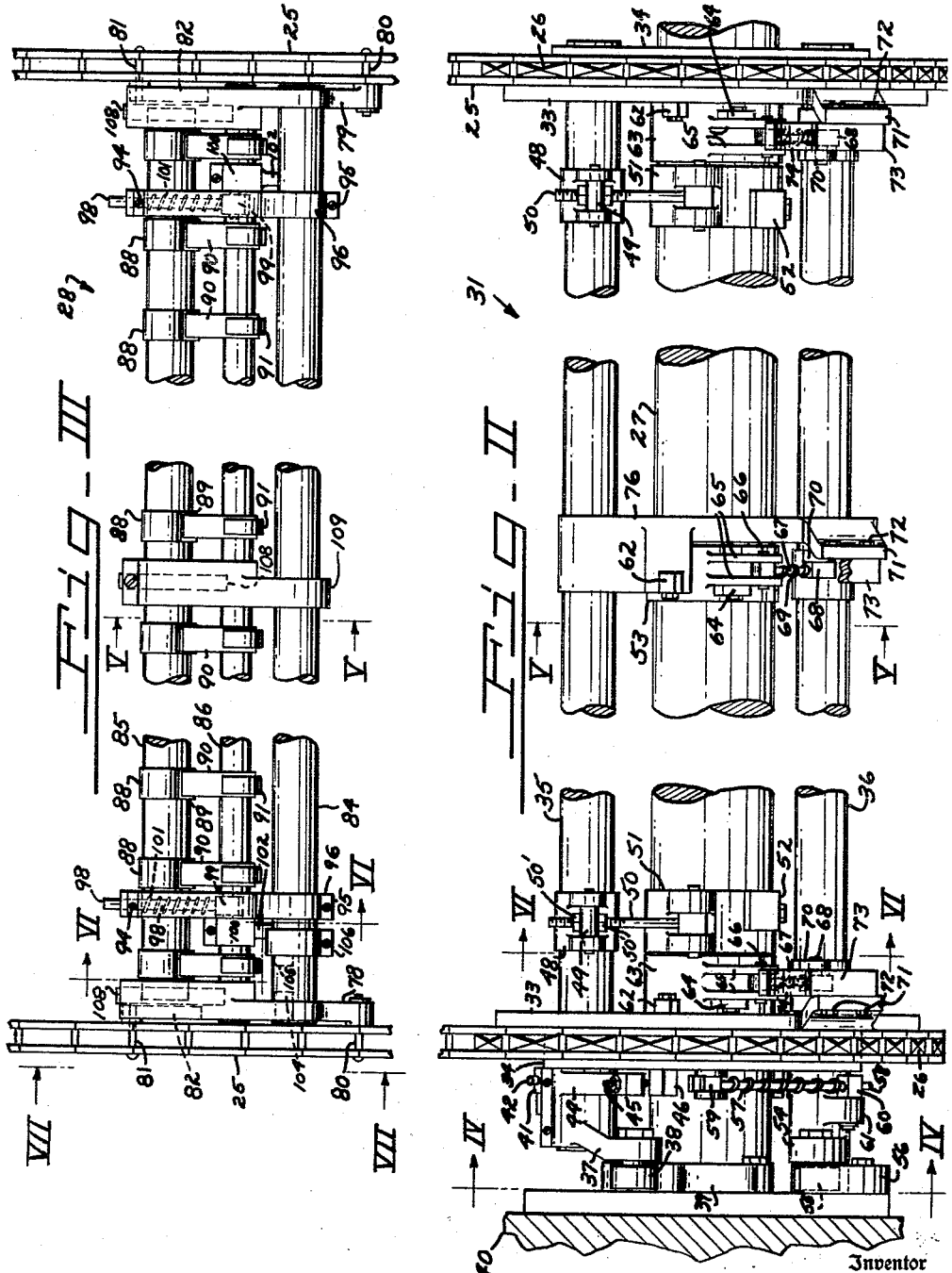

Dec. 3, 1957 J. R. WOOD 2,815,208
SHEET CONVEYOR MECHANISM
Filed Aug. 17, 1953 5 Sheets-Sheet 3
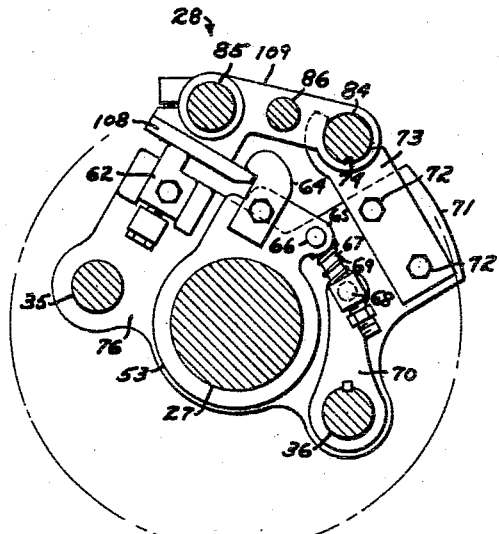
_Fig_V
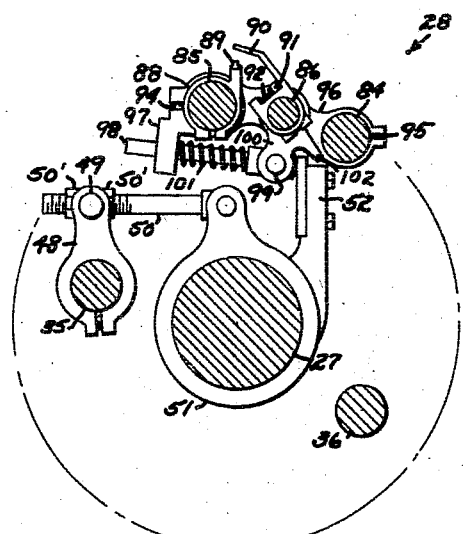
_Fig_VI
Inventor
JAMES R. WOOD
By Hudson, Boughton,
Williams, David & Hoffmann
Attorneys

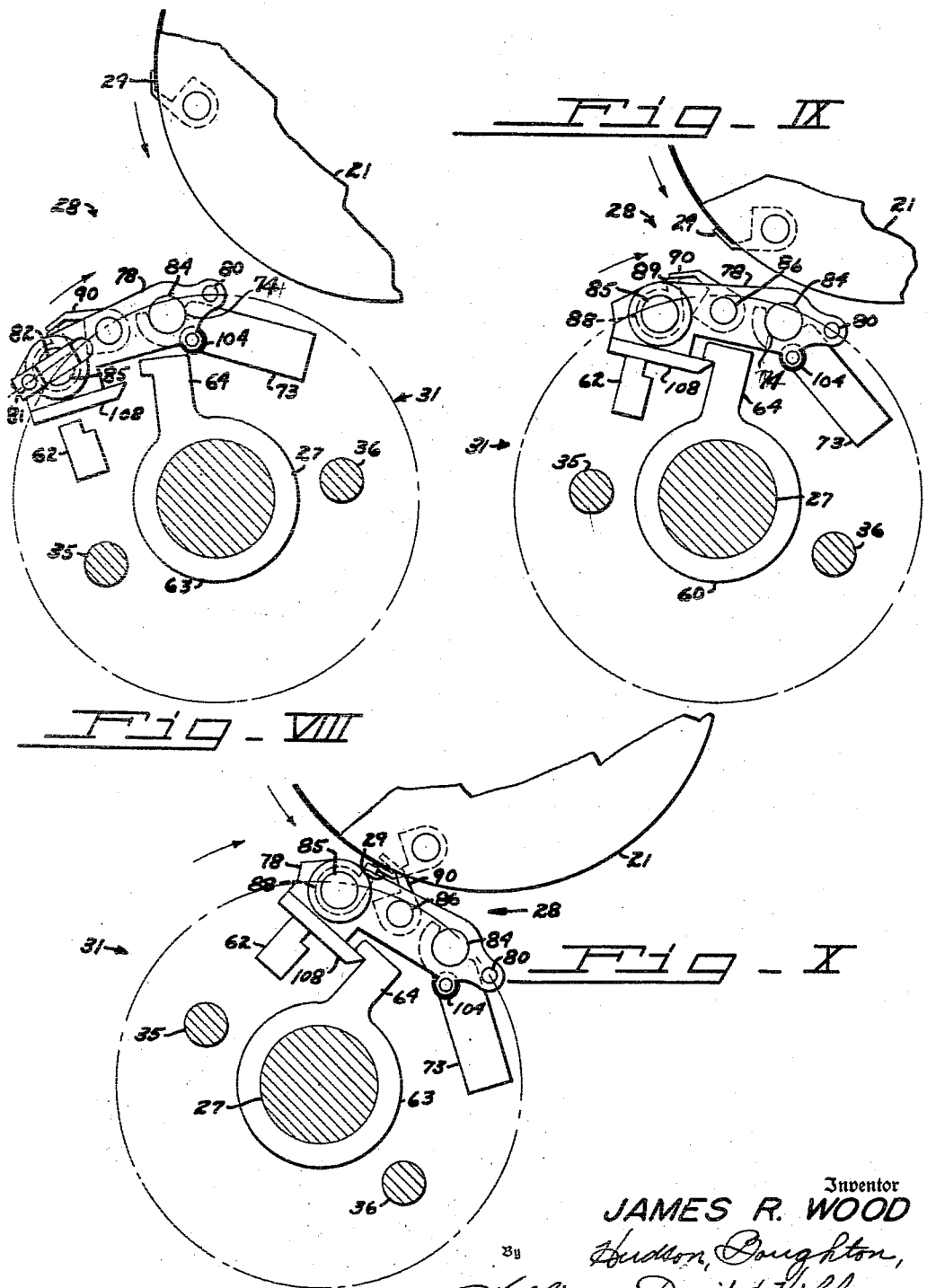

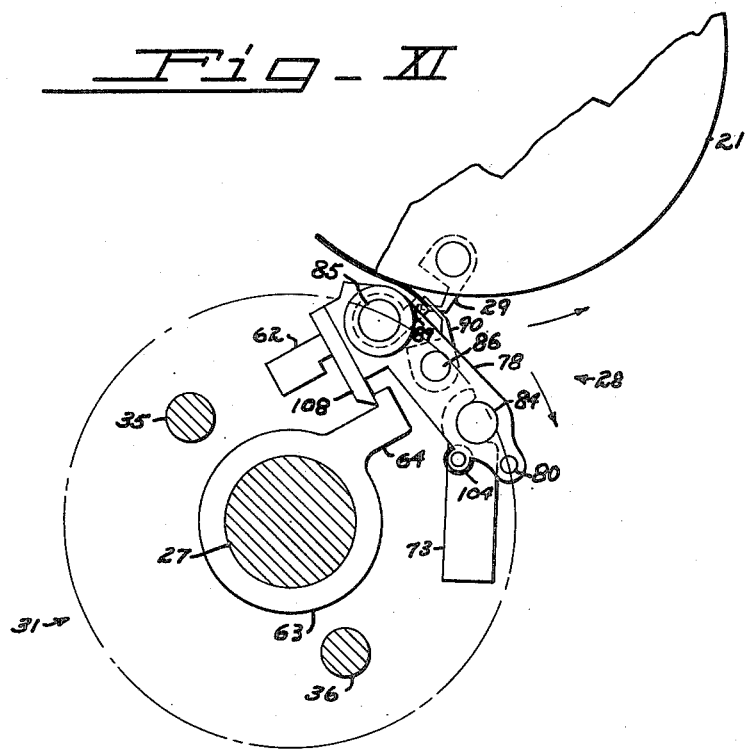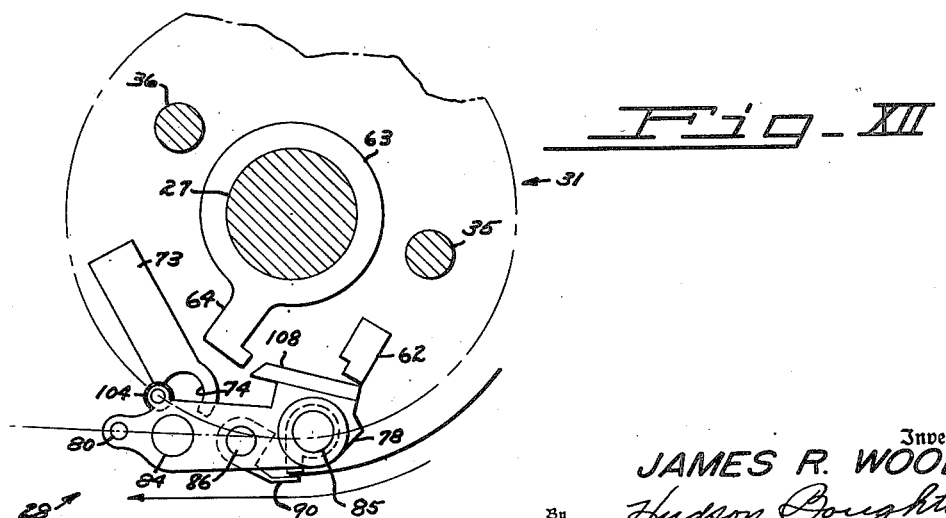

United States Patent Office 2,815,208
Patented Dec. 3, 1957

2,815,208

SHEET CONVEYOR MECHANISM

James R. Wood, De Bary, Fla., assignor to Harris-Seybold Company, Cleveland, Ohio, a corporation of Delaware Application August 17, 1953, Serial No. 374,517

11 Claims. (Cl. 271—45)

This invention relates to improvements in sheet conveyor mechanisms, and more particularly to endless chain conveyors for sheet fed printing presses, which conveyors comprise a series of transverse sheet gripper assemblies moving with the chains together with means for registering and locking the assemblies to one or more cylinders of the press over which the conveyor runs in order that sheets carried by the conveyor may be printed in register and/or transferred in register to or from the conveyor.

One of the objects of the invention is the provision of mechanism of the character stated which shall function with extreme accuracy.

Another object is the provision of registering means for a gripper assembly of a sheet conveyor, in which the principal registering points are arranged in advance of the gripped edge of the sheet with respect to its direction of movement.

Still another object is the provision of means for registering a gripper assembly of a sheet conveyor with respect to a cylinder around which the conveyor travels, comprising means associated with the leading portion of the assembly providing circumferential and radial registration of that portion of the assembly with respect to the cylinder, and means associated with a rearward portion of the assembly providing radial registration of that portion of the assembly.

Another object is the provision of means for registering and locking a gripper assembly of a sheet conveyor to a cylinder having two registering points spaced in the direction of sheet travel and having locking means arranged to engage the gripper assembly between the two points to draw the assembly inwardly of the cylinder against the registering points and hold it in such position.

Another object is the utilization of an element employed in registering the gripper assembly circumferentially and radially as an element of a means for accomplishing registration transverse to the line of travel.

Another object is the provision of a gripper assembly for use in such chain conveyor mechanism comprising a plurality of shafts mounted in opposed plates carried by the chains, the foremost shaft of the assembly fitting into sockets carried by a cooperating cylinder to register the assemblies with the cylinder.

Another object is the provision of novel means for locking the assembly to the cylinder when the said foremost shaft has come into registering position on the cylinder and until after a sheet is transferred to or from the assembly.

A further object is the provision of novel means carried by the gripper assembly biasing the gripper fingers to closed position and adapted to be actuated to finger open position by means on the transfer cylinder.

Other objects and features of novelty will appear as I proceed with the description of that embodiment of the invention which, for the purposes of the present application, I have illustrated in the accompanying drawings, in which Fig. I is a diagrammatic view of two units of a multi-color printing press with my sheet conveyor interposed between them, the view being illustrative of one application of the invention;

Fig. II is a fragmental plan view of a skeleton transfer cylinder built in accordance with the invention;

Fig. III is a plan view of one of the gripper assemblies forming a part of the chain conveyor;

Fig. IV is an end view of operating mechanism for the skeleton cylinder, the view being partly in section on the line IV—IV of Fig. II;

Fig. V is a cross sectional view taken substantially on the line V—V of Fig. II, but showing a gripper assembly in registering position on the cylinder, the assembly being taken substantially on the line V—V of Fig. III;

Fig. VI is a similar view taken substantially on the line VI—VI of Fig. II and VI—VI of Fig. III;

Fig. VII is a side elevational view on a larger scale, the view looking in the direction of the arrows VII—VII of Fig. III, but with the chain transposed into position over a sprocket of Fig. II;

Figs. VIII, IX, X, XI and XII are diagrammatic views showing consecutive positions of a gripper assembly as a sheet is being transferred to it from an impression cylinder.

In Fig. I of the accompanying drawings 20 and 21 represent form and impression cylinders respectively, of one unit of a multicolor printing press, this unit receiving sheets from a previous unit by way of transfer means such as a double size transfer cylinder 22. Similarly 23 and 24 represent form and impression cylinders of another printing unit. The sheets printed in the couple 20, 21 are taken by an endless chain conveyor comprising a pair of spaced endless chains 25 running over sprockets 26 fixed to a central shaft 27 of a skeleton cylinder 31. The conveyor carries a series of gripper assemblies 28 spaced apart a distance corresponding to the circumference of the impression cylinders 21 and 24.

The impression cylinder 21 and the shaft 27 are intergeared so that each time the grippers 29 on cylinder 21, see Figs. VIII to XII, pass the line of centers of cylinder 21 and shaft 27 a sheet may be transferred from cylinder 21 to a gripper assembly 28 then passing the line of centers as indicated in Figs. X and XI. Similarly each sheet carried by a gripper assembly along the lower run of the conveyor will be delivered by the assembly to the grippers, not shown, of impression cylinder 24, after which it will be printed in the couple 23, 24 and taken by transfer cylinder 30 or by sheet delivery mechanism, as may be desired. It will be apparent that the two skeleton transfer cylinders, generally designated 31 and 32, and the mechanism carried thereby may be similar, and consequently cylinder 31 only will be described in detail.

The sprockets 26 at both ends of skeleton cylinder 31 are fixedly mounted on plates 33 of hubs 34 keyed to shaft 27. In these hubs 34 there are journaled two shafts 35 and 36. Shaft 35 carries a lever 37 upon one end of which there is rotatably mounted a cam follower 38 which is adapted to run over a cam 39 that is bolted to the frame 40 of the machine. The opposite end of the lever carries a noddle pin 41 through which extends a rod 42 that is pivoted at 43 to the sprocket or parts fixed thereupon. On the lever there is a projecting arm 44 carrying an adjustable screw 45 which contacts a stop 46 on the sprocket except when follower 38 is in engagement with cam 39. A spiral spring 47 surrounding rod 42 holds follower 38 on its cam and swings lever 37 to turn shaft 35 clockwise when the cam permits.

Inwardly of the sprocket 26 on the left side of the machine, as viewed in Fig. II, shaft 35 has clamped thereto a crank arm 48 carrying a noddle pin 49 which is bored to take the threaded end of a rod 50 which is pivotally connected to a collar 51 that is rotatably mounted on shaft 27. Nuts 50' are provided to adjustably clamp the rod 50 to the noddle pin 49. Collar 51 carries an upwardly projecting abutment 52. These parts are duplicated on the other side of the machine inwardly of the sprocket 26 on that side, as illustrated in Fig. II.

Shaft 36 outwardly of the sprocket on the left side of the machine, as viewed in Fig. IV, has keyed thereto a lever 54 on the outer end of which is a roller follower 55 that runs upon the inner surface of a cam 56 which is bolted to the frame. This follower is held against its cam by a spring 57 which surrounds a rod 58 pivoted at 59 to the sprocket or the plate 34 attached thereto. The other end of rod 58 extends through a hole in a noddle pin 60 which is pivotally mounted upon an arm 61 integral with lever 54. The opposite end of that lever carries an adjustable screw 75 which is adapted to contact a stop 77 mounted on the sprocket 26 to limit the swing of lever 54 clockwise when follower 55 is off the cam.

On the inner face of plate 33 there is adjustably mounted a stop or abutment 62. Adjacent plate 33 a collar 63 is rotatably mounted on the shaft 27. It carries a hook 64. It also carries a bifurcated arm 65 in which is mounted a pin 66 which pivotally supports one end of a rod 67. The opposite end of rod 67 extends through a hole in a noddle pin 68 and a spring 69 surrounding the rod bears against the head of the rod and noddle pin 68. The latter pin is pivotally mounted in the free end of a crank arm 70 which is keyed to shaft 36. Plate 33 has an offset portion 71 to which is fastened by means of bolts 72 a centering block 73 in the upper end of which there is formed a socket or recess 74 of semicircular contour. These parts are duplicated except as to rights and lefts at the opposite side of the machine. The end of shaft 84 which is adapted to seat in the socket 74 may be considered to be a protrusion cooperating with a socket 74, and it will be appreciated that these parts may be reversed, that is the socket may be formed in the assembly 28 and the protrusion in the skeleton cylinder 31. In any case of course the assembly must be able to swing on an axis formed by the cooperating protrusion and socket.

At one or more intermediate points between the ends of the transfer cylinder 31 there is mounted upon and fixed to shaft 27 a bracket 76 having bearings for the shafts 35 and 36. A collar 53 similar to collar 63 is loosely mounted on shaft 27 adjacent bracket 76, which collar carries a hook 64, a bifurcated arm 65 and other parts corresponding to the parts similarly numbered at the sides of the cylinder. Similarly, the crank arm 70 communicates motion to the collar 53 in the same manner as is done by the parts at the sides of the cylinder bearing the same reference numbers. Consequently the three or more hooks 64 may be swung through a limited angle simultaneously by the oscillation of shaft 36.

Each of the gripper assemblies 28 comprises two side plates 78 and 79 which are duplicates except for rights and lefts. In Fig. VII the chain 25 is broken away for the space of several chain lengths in order to better disclose the plate 78 which is disposed on the inner side of the chain. The plate 78 is carried by the chain pins 80 and 81. The forward end of the plate is mounted directly on pin 80, while at the rear end the chain pin 81 is pivotally mounted in a block 82 which is slidably mounted in a slot 83 formed in the plate. When the chain is moving along a straight course, as it does in portions of its travel, the distance between pivot pins 80 and 81 is greater than when the chain is passing around sprocket 26. The block and slot connection compensates for that difference.

In the side plates 78 and 79 there are fixedly mounted, as by clamping or otherwise, two cross members which in the illustrated case take the form of shafts 84 and 85. In this manner a rigid frame is effected forming the main part of the gripper assembly. At an intermediate position between the two shafts 84 and 85 there is a further shaft or cross member 86 which is rotatably or oscillatably mounted in the side plates 78 and 79. 86 is the gripper shaft of the gripper assembly.

At intervals along the length of shaft 85 there are collars 88 which are clamped to the shaft by suitable means. Each of these collars carries an upwardly extending projection upon which is mounted a gripper pad 89. Opposite each gripper pad a gripper finger 90 is rotatably mounted on shaft 86. Gripper dogs 91 are fixed to shaft 86 and function through spiral springs 92 to exert pressure for closing the fingers upon the pads 89, this being a conventional construction in the art.

In order to reduce torsion in shaft 86 as much as possible the force for operating the shaft is applied at both ends thereof. Near each end of the fixed shafts 84 and 85 there is clamped by screws 94 and 95 a bracket 96, on the rear end of which there is a dependent projection 97 having a hole therethrough which receives a rod 98, the opposite end of which is mounted on a pivot 99 that is carried in a crank arm 100 which is clamped to shaft 86. Between projection 97 and pivot 99 rod 98 is encircled by a spring 101 which tends to swing crank arm 100 counterclockwise and turn shaft 86 accordingly toward gripper closing position. Crank arm 100 has an integral extension 102 that is adapted to engage shaft 84 to limit motion in this direction.

On the inner side of side plate 78 beneath shaft 84 there is an inwardly extending projection 104, and opposite the same, but spaced therefrom a distance equal to the width of the corresponding block 73, there is a similar projection 105 carried by a collar 106 adjustably clamped to shaft 84. These projections 104 and 105 engage the sides of corresponding centering block 73, and to facilitate such engagement are preferably beveled slightly. By this means the position of the gripper assembly transversely of the machine is accurately controlled while the assembly is passing around the cylinder or at least while it is in sheet transferring position.

On the underside of each of the side plates 78 and 79 there is attached integrally or otherwise a lock plate 108 which is adapted to bear against stop 62 when the gripper assembly comes into registering position with the skeleton cylinder. The forward edge of this lock plate is adapted to be engaged by the hook 64, as illustrated in Fig. V. At one or more intermediate points between the brackets 96 there is another bracket 109 which is clamped or otherwise secured to shafts 84 and 85 and has a bearing in which shaft 86 is journaled. This bracket also carries a lock plate 108 on its underside adapted to be engaged by the hook 64 on the collar 53. The bracket 109 being secured to the shafts 84 and 85 helps to make a rigid frame for the gripper assembly in addition to providing a third bearing for the shaft 86.

Preferably, the engaged upper surface of each of the lock plates 108 is inclined with respect to a radial line from the shaft 27 through the forward edge of the plate 108, and each hook 64 is provided with a corresponding inclined surface whereby an arcuate movement of the hook produces a thrust on the gripper assembly in the general direction of the center of the cylinder. Various inclinations may be used, but preferably the inclination should be such as to provide sufficient inward thrust to properly seat and hold the assembly in registered position.

Operation.—The operation of the mechanism will be described with particular reference to Figs. VIII to XII inclusive, which show diagrammatically the manner in which a gripper assembly is registered and locked with respect to the skeleton cylinder, and the manner in which it is released from said skeleton cylinder after having received a sheet from an impression cylinder. As the assembly approaches the position of Fig. VIII, the shaft 84 gradually enters the socket 74 of the centering block 73, and the trailing end of the gripper assembly moves toward the stop 62. In addition projections 104 and 105 encompass the sides of the centering block to register the assembly sidewise. When the shaft 84 has substantially entered the socket 74 as shown in Fig. VIII, movement of the gripper assembly is pivotal about the axis of the shaft until the assembly is fully seated on the stop 62 or nearly so as shown in Fig. IX. Hook 64 is then actuated by the means aforementioned to engage with the plate 108 to register the gripper assembly with respect to the cylinder 31. At this point the assembly is fully registered by the block 73 and stop 62 against circumferential and radial movement and by the projections 104 and 105 against transverse movement. The grippers 90 which have been closed prior to such registration now open in response to pivotal movement of the cam actuated shaft 35 as described previously. Reception of the sheet by the grippers 90 from the impression cylinder 21 is illustrated in Figs. X and XI. Fig. X illustrates the grippers 90 of the cylinder 31 as about to grip a sheet held by the grippers 29 of the impression cylinder 21. In Fig. XI grippers 90 have taken the sheet and grippers 29 have released it.

After the grippers 90 have firmly grasped the sheet, the return spring 57 (Fig. IV) of the cam actuated locking mechanism causes withdrawal of the hooks 64 from their position over locking plates 108. As the cylinder further rotates to the position shown in Fig. XII, the chain assumes a path leading away from the cylinder. As a consequence thereof, a peeling action of the gripper assembly away from the cylinder results. Shaft 84 exits from socket 74 since the hook 64 no longer holds the assembly against radial movement. The locking plate 108 breaks away from stop 62 and the cylinder and its associated parts rotate to receive, register and lock subsequent gripper assemblies.

While I have illustrated my invention in connection with a conveyor mechanism for transferring sheets from the grippers of one impression cylinder of a press to the grippers of another impression cylinder, the invention may be adapted for use in conveyor mechanism in which the sheet gripper assemblies themselves travel through one or more printing units while retaining their grip upon the sheets, each assembly in turn being registered and locked to one of the printing cylinders, such as the impression cylinder, in order to cause the sheet to be printed in accurate register with its edges or with the printing applied by other printing units. Therefore I do not wish to be limited to the form illustrated herein, except as such limitation is expressly included in the claims.

Having thus described my invention, I claim:

1. In sheet conveyor mechanism for a printing machine, a cylinder having sprockets at its ends, a pair of chains traveling over said sprockets, a gripper assembly carried at its ends on said chains, said assembly having leading and trailing portions, cooperating male and female protrusion and socket members, one carried by said cylinder and the other by the leading portion of said assembly, arranged to register the leading portion of said assembly about a transverse axis fixed circumferentially and radially relative to said cylinder and adapted to rock the assembly relatively about said axis, cooperating abutments, one on the trailing portion of said assembly and one on said cylinder, arranged rearwardly of said protrusion and socket members relative to the direction of cylinder travel and effective to register a rear portion of said assembly radially relative to said cylinder, and means for holding said members and said abutments in contact for part of a cylinder revolution.

2. Mechanism as claimed in claim 1 wherein the cooperating surfaces of said protrusion and socket members are substantially semicylindrical in form, whereby pivoting of said gripper assembly about said fixed axis relative to said cylinder as said abutments approach each other is facilitated and accuracy of registration is attained.

3. Mechanism as claimed in claim 1 wherein said holding means comprises means carried by said cylinder engaging said gripper assembly between said abutments and said cooperating protrusion and socket members.

4. Mechanism as claimed in claim 1 wherein said holding means comprises a member pivotally mounted on said cylinder and operated to swing rearwardly relative to cylinder travel into engagement with means on said assembly to impart a thrust to said assembly inwardly toward the center of said cylinder.

5. Mechanism as claimed in claim 1 wherein said protrusion member is on said gripper assembly and said socket member is on said cylinder including means, effective prior to engagement of said cooperating protrusion and socket members, for aligning said gripper assembly relative to said cylinder in a direction transverse to the direction of cylinder travel.

6. In sheet conveyor mechanism for a printing machine or the like, a cylinder having sprockets at its ends, a pair of parallel chains traveling over said sprockets, said cylinder comprising a central shaft upon which the sprockets are fixed and two oscillatable shafts parallel to said central shaft, a gripper assembly comprising side plates carried on said chains and a plurality of cross members mounted in said plates, one of the cross members of said assembly being a rotatable shaft carrying gripper fingers and another of said cross members carrying gripper pads cooperating with said fingers, centering blocks carried by said cylinder adapted to receive one of the cross members of said assembly, a locking plate carried by each side plate radially inward from the cross members of said assembly, a first set of collars pivotally mounted on said central shaft, hooks carried thereby adapted to engage said locking plates, a second set of collars pivotally mounted on said central shaft, means carried by each of the collars of said second set for swinging said gripper finger shaft to gripper open position, spring means for returning the shaft to gripper closed position, one of said oscillatable shafts turning one of said sets of collars and the other turning the other of said sets of collars, and cam and lever means actuated by the rotation of said cylinder for oscillating each of said oscillatable shafts as they pass predetermined points in the rotation of said cylinder.

7. Sheet conveyor mechanism as defined in claim 6, wherein said cross members are spaced in the direction of chain travel and wherein the cross member which is received by said centering blocks is the foremost cross member of the assembly.

8. Sheet conveyor mechanism as defined in claim 6, wherein each of said side plates of the gripper assembly is of a length equal to at least two chain links and is mounted at its forward end directly on a pin of the chain and at its rear end on means providing a self-adjusting connection with a further chain pin to compensate for the varying distance between said pins as they travel in a straight path and in a curved path around a sprocket.

9. Sheet conveyor mechanism as defined in claim 6, wherein said cross members are spaced in the direction of chain travel and wherein said centering blocks are disposed to receive the foremost cross members of the assembly and wherein each of said locking plates is disposed inwardly of the rearmost cross member of the assembly, and comprising stops on said cylinder against which a rear portion of each locking plate bears when the assembly comes into register with the transfer cylinder, and wherein said hooks engage the forward ends of said locking plates.

10. In sheet conveyor mechanism for a printing machine, a machine frame, two spaced parallel endless chains, a gripper assembly comprising two side plates carried by said chains and three cross members spaced longitudinally of the conveyor and mounted in said side plates including two shafts one of which is fixed in said side plates and the other of which is rockable therein, a cylinder with sprockets at its ends over which said chains run, centering blocks carried at the ends of said cylinder having sockets in which one of said shafts is adapted to fit as the assembly comes into registering relation with said cylinder, means for locking said side plates to said cylinder after the assembly comes into registering relation with the cylinder and thereby holding said assembly fixed to the cylinder during a part of its travel around the cylinder, said rockable shaft having gripping fingers thereupon and another cross member having gripper pads thereupon for cooperation with said fingers, a fixed cam on said frame, and a lever on said cylinder rocked by said fixed cam and adapted to actuate said gripper shaft as said assembly passes a given point in the movement of said chains over said sprockets.

11. Sheet conveyor mechanism as defined in claim 10 wherein said cross members are spaced in the direction of chain travel and wherein the shaft which is received by said centering blocks is the foremost cross member of the assembly.

References Cited in the file of this patent

UNITED STATES PATENTS

| | | |
|---|---|---|
| 1,092,998 | Kelly | Apr. 14, 1914 |
| 1,093,152 | Smith | Apr. 14, 1914 |
| 1,746,492 | Newton | Feb. 11, 1930 |
| 1,476,713 | Harrold | Dec. 11, 1923 |
| 2,138,405 | Huck | Nov. 29, 1938 |
| 2,138,407 | Huck | Nov. 29, 1938 |
| 2,245,343 | Hunting | June 10, 1941 |
| 2,425,680 | Kaddeland | Aug. 12, 1947 |